(12) United States Patent
Hageman (10) Patent No.: US 7,914,225 B2
(45) Date of Patent: Mar. 29, 2011

(54) RELEASE PIN

(75) Inventor: David Craig Hageman, Chagrin Falls, OH (US)

(73) Assignee: Jergens, Inc., Cleveland, OH (US)

( * ) Notice: Subject to any disclaimer, the term of this patent is extended or adjusted under 35 U.S.C. 154(b) by 279 days.

(21) Appl. No.: 12/080,512

(22) Filed: Apr. 3, 2008

(65) Prior Publication Data

US 2008/0247814 A1 Oct. 9, 2008

Related U.S. Application Data

(60) Provisional application No. 60/921,904, filed on Apr. 5, 2007.

(51) Int. Cl.
*F16B 21/00* (2006.01)

(52) U.S. Cl. .............. 403/322.2; 403/325; 403/408.1; 411/348

(58) Field of Classification Search ......... 403/322.2, 403/325, 408.1; 24/607, 453; 411/348
See application file for complete search history.

(56) References Cited

U.S. PATENT DOCUMENTS

| | | | | |
|---|---|---|---|---|
| 1,923,025 A * | 8/1933 | Morse et al. | | 70/34 |
| 3,068,737 A * | 12/1962 | Mewse | | 411/348 |
| 3,085,462 A | 4/1963 | Myers | | |
| 3,277,767 A | 10/1966 | Allen et al. | | |
| 4,049,313 A | 9/1977 | Lundberg | | |
| 4,614,097 A * | 9/1986 | Signorelli | | 70/34 |
| 4,689,978 A | 9/1987 | Drummond | | |
| 4,840,049 A * | 6/1989 | Russo | | 70/34 |
| 4,970,761 A * | 11/1990 | Nakamura | | 24/453 |
| 5,027,624 A * | 7/1991 | Agbay et al. | | 70/34 |
| D350,686 S | 9/1994 | Myers | | |
| 5,394,594 A | 3/1995 | Duran | | |
| D398,221 S | 9/1998 | Weber et al. | | |
| RE36,351 E | 10/1999 | Yamamoto et al. | | |
| D468,621 S | 1/2003 | Farrar et al. | | |
| 6,752,562 B2 | 6/2004 | Mills et al. | | |
| D498,408 S | 11/2004 | Haas | | |
| 6,840,703 B2 | 1/2005 | Blanchard | | |
| 6,886,376 B2 | 5/2005 | Kuo | | |
| D511,674 S | 11/2005 | Myers et al. | | |
| D515,399 S | 2/2006 | Ho | | |

(Continued)

OTHER PUBLICATIONS

International Preliminary Report on Patentability, dated Oct. 6, 2009, in connection with PCT/US2008/004387, filed Apr. 4, 2008.
Primary Fasteners Ltd., Data sheets for Single Action Ball Lock Pins, (www.prifast.co.uk).
International Search Report dated Jun. 27, 2008 (Appln. No. PCT/US08/04387, filed Apr. 4, 2008).

(Continued)

*Primary Examiner* — Michael P Ferguson
(74) *Attorney, Agent, or Firm* — Rankin, Hill & Clark LLP (57) ABSTRACT

A release pin for selective engagement with at least one work piece, the pin extending in a longitudinal direction with an inner portion and an outer portion. The inner portion including a shank having an exterior portion extending in the longitudinal direction between a first end and a second end and the inner portion further including a locking arrangement near the second end. The shank exterior being sized to pass through an associated bore extending into an associated surface of an associated work piece. The outer portion being joined to the inner portion near the first end and including an abutment extending transverse to the longitudinal direction and being shaped to engage the associated surface when the shank is positioned in the associated bore such that the outer portion is defined by the abutment and has an outer longitudinal height extending in the longitudinal direction outwardly from the abutment and the associated surface when the pin is secured to the associated work piece. The outer longitudinal height being less than 1 inch.

24 Claims, 7 Drawing Sheets

U.S. PATENT DOCUMENTS

| | | |
|---|---|---|
| D534,054 S | 12/2006 | Garcia et al. |
| D559,079 S | 1/2008 | Berry et al. |
| D581,248 S | 11/2008 | Wu et al. |
| 7,484,919 B2 * | 2/2009 | Hansen ............ 411/45 |

OTHER PUBLICATIONS

Written Opinion dated Jun. 27, 2008 (Appln. No. PCT/US08/04387, filed Apr. 4, 2008).

* cited by examiner

RELEASE PIN

This application claims priority based upon provisional application Ser. No. 60/921,904, filed Apr. 5, 2007.

The invention of this application relates to release pins and, more particularly, to quick release pins.

BACKGROUND OF THE INVENTION

Releasable securing devices, such as ball pins, are commonly used for joining two parts such as the parts of industrial fixtures together. Such ball pins have a hollow, hardened stem insertable through mating bores in the two parts to be joined. The device further includes an abutment surface on one side of the stem configured to be pressed against the one side of the stacked parts. The other side of the device includes depressible or retractable balls near the tip of the pin which are configured to engage the other side of the parts when they are in the extended position.

Quick connect ball locking devices generally include a plurality of detents, such as balls, trapped within a tube but protruding out openings therein. A ball actuator is reciprocal within the tube and movable from a first position wherein the balls are retracted substantially within the tube or moved outwardly a sufficient distance to lock the balls within a mating receptacle. An example of such a ball locking device is shown in U.S. Pat. No. 7,752,562 which is incorporated by reference herein. U.S. Pat. No. 5,394,594 also shows such a releasable securing device and is also incorporated by reference herein for showing the same. U.S. Pat. No. 3,277,767 shows yet another releasable securing device and is also incorporated by reference herein for showing the same. Also incorporated by reference are printouts and data sheets from www.prifast.co.uk showing many of the available handle configurations and the fact that these pins, as with the pin of this invention, can be produced in a wide range of sizes including, but not limited to, many different shank diameters and lengths. Further, as will be discussed in greater detail below, the pins of this invention can be made from a wide variety of materials including currently known materials and other materials that may be determined in the future to provide advantageous pin characteristics.

However, in order to provide a way in which to easily remove these pins, they include handle portions spaced from the abutment surface to provide a means to pull the pin from the mating bores in the two parts to be joined. Typically, a push button is positioned in a handle portion wherein depressing the button releases the locking balls positioned in the stem or shank. Accordingly, the user will depress the button while they pull on the handle to remove the pin. While a wide range of handle configurations are available, all are designed to provide a pulling means that extends from the abutment surface to allow the user to easily remove the pin from the two parts to be joined. This configuration is the basis for naming these devices either "release pins" or "quick release pins."

This "spaced" handle configuration is shown, for example, in U.S. Pat. Nos. 3,277,767; 5,394,594 and 7,752,562. With reference to U.S. Pat. No. 7,752,562, shown is a quick release pin 10 that includes a handle 12. Handle 12 includes a bottom surface 22 that acts as the means to pull the pin from the mating bores in the two parts to be joined. The downwardly extending circular portion 27 provides the necessary spacing between the parts and the handle such that the user can position their fingers against surface 22 to pull the pin from the parts. As can be appreciated, the spacing between surface 22 and the parts needs to be sufficient to allow a wide variety of fingers to fit between the spacing between surface 22 and the parts.

Figure 1:
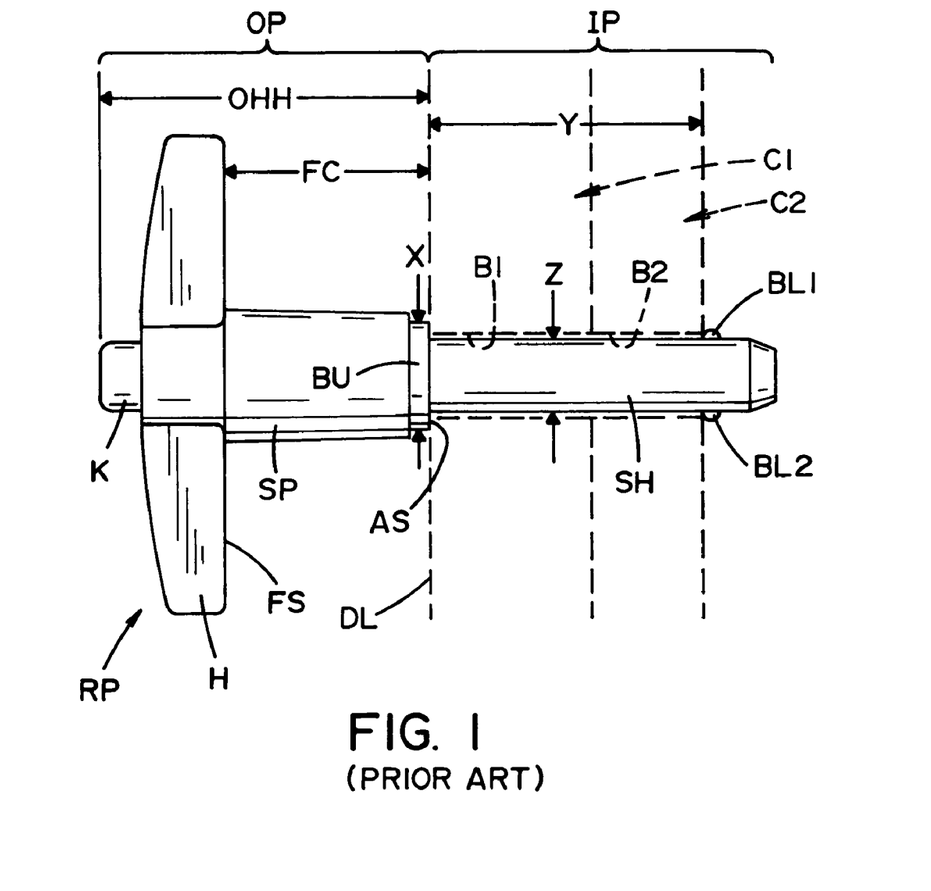
FIG. 1 is a side and a top view of a prior art release pin positioned relative to work pieces C1 and C2.
Figure 2:
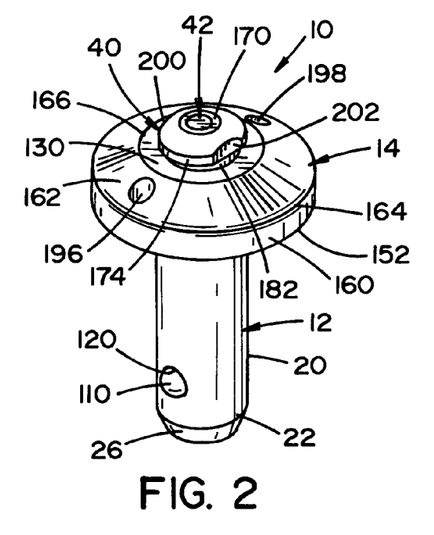
FIG. 2 is a side perspective view of a release pin in accordance with an embodiment of the present invention.
Figure 3:
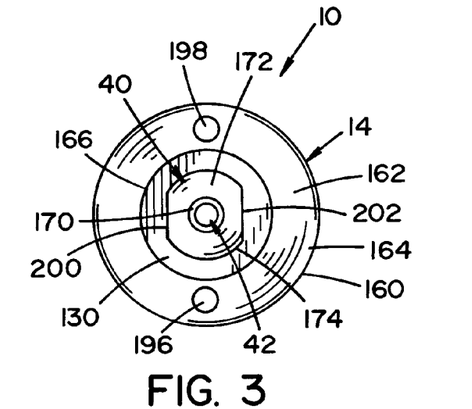
FIG. 3 is a top view of the release pin shown in FIG. 2.
Figure 4:
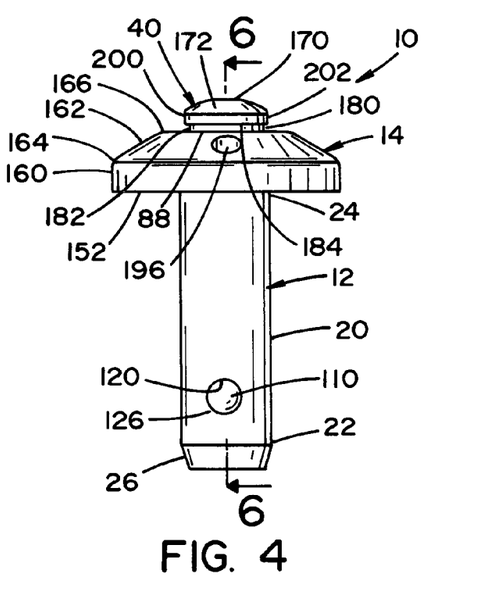
FIG. 4 is a side view of the release pin shown in FIG. 2.
Figure 5:
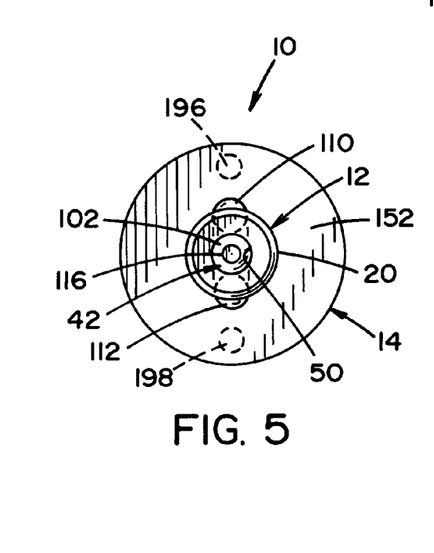
FIG. 5 is a bottom view of the release pin shown in FIG. 2.

With reference to FIG. 1, shown is a prior art release pin RP having a handle H, a knob or push button K and a shank SH. Pin RP further includes a bushing BU having an abutment or abutment surface AS facing shank SH. Busing BU is between handle H and shank SH and it limits the movement of shank SH within bores B1 and B2 of components C1 and C2, respectively. Essentially, abutment surface AS creates a dividing line DL between an outer portion OP of pin RP and an inner portion IP of pin RP. In this respect, shank SH has a diameter Z and abutment surface AS has a diameter X wherein diameter X is greater than diameter Z such that the abutment surface will not enter the bores. However, diameter Z of shank SH is smaller than the diameter of bores B1 and B2 to allow the shank to enter these bores. As a result, the shank can enter the bores but the abutment surface will prevent the bushing from entering and, thus, stop the inward movement of shank SH in bores B1 and B2. Accordingly, the portions of the release pin on the handle side of dividing line DL and abutment surface AS (OP) will not enter into the bores and the portions of the release pin that are on the shank side of dividing line DL and the abutment surface AS (IP) will enter into the bores.

Release pin RP further includes actuation balls BL1 and BL2 that are space from abutment surface AS a distance Y such that the balls extend out of the bore B2 of component C2 as the abutment surface engages component C1. While not shown, pin RP further includes a means to join balls BL1 and BL2 to knob K such that when knob K is depressed, the balls move inwardly in the shank so that the shank can move within the bores.

Release pin further includes a spacer SP between handle H and abutment surface AS to produce a finger clearance FC between component C1 and a finger surface FS on handle H. This creates an overall handle height OHH that, in this particular design, extends to the end of knob K. As can be appreciated, some handle configurations may include a recessed knob such that overall height OHH would not involve the knob. As a result of the need for spacer SP, the release pin has an overall height that is substantial.

SUMMARY OF THE INVENTION

The invention of this application relates to a release pin and is particularly directed to quick release pin that includes an outer portion that is minimized. More particularly, a release pin according to the invention of this application does not include a handle having a finger clearance.

According to one aspect of the present invention, provided is a release pin consisting of a shank, an bushing and a knob.

According to another aspect of the present invention, provided is a release pin that includes an outer portion that has a height that is less than 1 inch.

According to yet another aspect of the present invention, provided is a release pin that includes an outer portion that has a height that is less than 0.50 inches.

According to a further aspect of the present invention, provided is a release pin that includes an outer portion that has a height that is less than 0.35 inches.

According to yet a further aspect of the present invention, provided is a release pin that includes an outer portion that has a height that is approximately 0.30 inches.

According to another aspect of the present invention, provided is a release pin consisting of a shank, an bushing and a knob wherein the bushing has a height less than 0.400 inches and the knob has a height less than 0.200 inches.

According to another aspect of the present invention, provided is a release pin having of an bushing interengaging a shank such that the bushing is fixed relative to the shank. Further, the bushing includes the abutment sized to engage an associated component that the pin is to be secured to. The pin further includes a knob joined to a spindle shaft that move relative to the bushing and the shank such that this movement moves the locking balls between a locked position and an unlocked position. The knob engaging the bushing when the balls are in the locked position and being spaced from the bushing when the balls are in the unlocked position.

According to yet another aspect of the present invention, provided is a release pin consisting of a shank, an bushing and a knob. Further, the bushing interengaging the shank such that the bushing is fixed relative to the shank. The bushing extending from an abutment surface to an outer surface opposite to the abutment surface. The bushing having a cross-sectional configuration that extends inwardly from the abutment surface to the outer surface such that the bushing is generally a frustum cone.

According to yet even another aspect of the present invention, the frustum cone bushing further includes a cylindrical portion adjacent to the abutment surface.

According to a further aspect of the present invention, provided is a release pin having an bushing interengaging, a shank such that the bushing is fixed relative to the shank. Further, the bushing includes the abutment surface sized to engage an associated component that the pin is to be secured to. The pin further includes a knob joined to a spindle shaft that move relative to the bushing and the shank such that this movement moves the locking balls between a locked position and an unlocked position. The knob engaging the bushing when the balls are in the locked position and being spaced from the bushing when the balls are in the unlocked position.

According to yet a further aspect of the present invention, provided is a release pin having a shank, a spindle shaft, an bushing and a knob. Further, the bushing interengaging the shank such that the bushing is fixed relative to the shank. The bushing extending from an abutment surface to an outer surface opposite to the abutment surface. The bushing having a cross-sectional configuration that extends inwardly from the abutment surface to the outer surface such that the bushing is generally a frustum cone. The knob being joined to the spindle shaft that moves relative to the bushing and the shank such that said movement moves the locking balls between a locked position and an unlocked position. The knob engaging the outer surface of the bushing when the balls are in the locked position and being spaced from the bushing when the balls are in the unlocked position.

Other aspects of the present invention will become apparent to those of average skill in the art upon a reading and understanding of the following detailed description.

BRIEF DESCRIPTION OF THE DRAWINGS

The foregoing, and more, will in part be obvious and in part be pointed out more fully hereinafter in conjunction with a written description of preferred embodiments of the present invention illustrated in the accompanying drawings in which.

DETAILED DESCRIPTION OF EMBODIMENTS

Referring now to the drawings, in particular referring to FIGS. 2-6, and 9, shown is a quick release pin assembly 10 that includes a shank 12 and a bushing 14 that are the primary support portions of release pin 10. In this respect, shank 12 includes an exterior 20 that in this embodiment is a cylindrical exterior extending between inner extent 22 and an outer limit 24. Exterior 20 is dimensioned to allow shank 12 to enter bores B1 and B2 of workpiece components C1 and C2, respectively. While shank 12 is shown to be cylindrical, it can have other configurations without detracting from the invention of this application. Shank 12 can further include a tapered end portion 26 near inner extent or tip 22. Shank 12 can further include threaded portion 30 configured to interengage with a threaded portion 32 of bushing 14 to join or fix bushing 14 relative to shank 12. As can be appreciated, other means known in the art can be utilized to join bushing 14 to shank 12. This can include, but is not limited to, friction welding, adhesive bonding, press fitting and other fastening arrangements such as retainer or locking rings. As a result of the joining of bushing 14 with shank 12, these components act as a unified component and form much of the structural aspects of the release pin of this application.

Bushing 14 and shank 12 can be made from a wide range of materials known in the art that have material properties sufficient to produce the necessary physical characteristics of the locking pin. As can be appreciated, applications that include larger loads will need materials that are stronger than other applications. These materials can include natural or processed materials such as anodized aluminum and heat treated steels. Further, in view of the different loads applied to the different components, each component can be made from a different material based on the specific needs of the particular applications. For example, the shank can be formed by a heat treated steel while the bushing is formed out of aluminum. In one embodiment, the shank has a hardness of at least a value of 40 RC. As can be appreciated, any materials known in the art could be utilized for both bushing 14 and shank 12. Further, future materials used in the art could also be used for these components.

Release pin 10 further includes locking components that move relative to the bushing and the shank. In this respect, locking or release pin 10 further includes a knob 40 that is joined to a spindle shaft 42 such that knob 40 and shaft 42 move in unison with one another and relative to sank 12. As with the bushing and the shank, the knob and the spindle shaft can be joined to one another utilizing any means known in the art. In the embodiment shown, shaft 42 includes a threaded portion 46 and knob 40 includes a threaded portion 48. These threaded portions are configured to matingly engage with one another to secure the knob to the spindle shaft.

Shank 12 further includes an internal passage 50 extending between inner extent 22 and opposite end 52. Inner passage 50 is shaped to receive a corresponding portion of spindle shaft 42 to allow reciprocating motion of the spindle shaft relative to the shank and the bushing. However, inner passage 50 is not uniform across its length in this embodiment. In this respect, passage 50 includes a first portion 60 and a second portion 62 wherein these portions have different configurations. While the spindle shaft and the corresponding passage are shown to be cylindrical, other configurations could be used without detracting from the invention of this application. Passage 50 includes a flange 64 that separates portion 60 from portion 62. In addition, bushing 14 includes an inner passage 70 that allows a portion of spindle shaft to pass therethrough. In view of these passages, spindle shaft 42 can move relative to bushing 14 and shank 12 in a longitudinal direction L.

Spindle shaft also includes several portions extending between its inner extent 80 and its outer extent 82. More particularly, and beginning with outer extent 82, spindle shaft 42 includes threaded portion 46 extending longitudinally from extent 82 to flange portion 84 such that, in this embodiment, knob 40 can be securely threaded onto spindle shaft 42 until an inward surface 88 of knob 40 engages flange 84 of the spindle shaft. This allows positive engagement between these components when they are threaded towards one another. As will be discussed in greater detail below, these components are assembled after spindle shaft 42 is positioned within passage 50. Extending inwardly from flange 84 is undercut portion 90 that extends longitudinally to flange edge 92. As will be discussed in greater detail below, undercut 90 is provided to allow space for a return spring 96. As also will be discussed in greater detail below, other return or biasing configurations can be utilized without detracting from the invention of this application. Extending further inwardly and longitudinally from flange 92 is bearing region 100 that can be configured to guide spindle shaft within passageway 50 as it reciprocates relative to the shank and the bushing. Bearing portion 100 can extend inwardly and longitudinally to cam section 102 that is configured to actuate of projectiles 110 and 112. It should be noted that projectiles 110 and 112 are shown in this embodiment to be locking or hardened balls. However, other forms of projectiles can be used without detracting from the invention of this application. This can include, but is not limited to, projectiles having a cylindrical cross-section configuration adapted to be actuated by cam 102 or other actuating mechanisms. Extending inwardly and longitudinally from cam portion 102 is undercut 116 which can extend to inner extent 80.

Shank 12 further includes ball pockets 120 and 122 that are shaped to receive locking balls 110, 112, respectively. In order to prevent the locking balls from inadvertently dislodging from openings 120 and 122, these openings can include a crimped edge portion 126 and 128, respectively.

Figure 6:
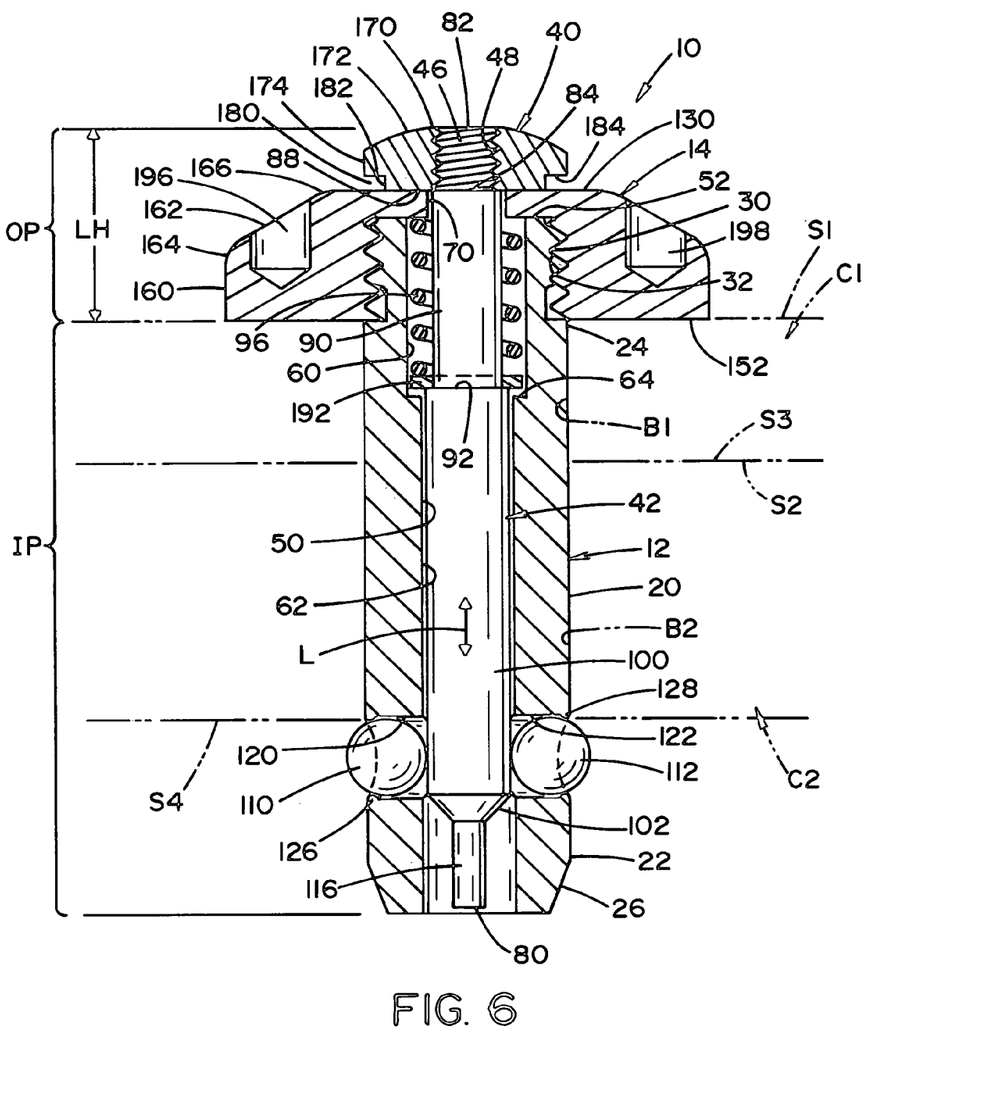
FIG. 6 is an enlarged sectional view taken along lines 6-6 in FIG. 4, showing the release pin in a locked condition.
Figure 8:
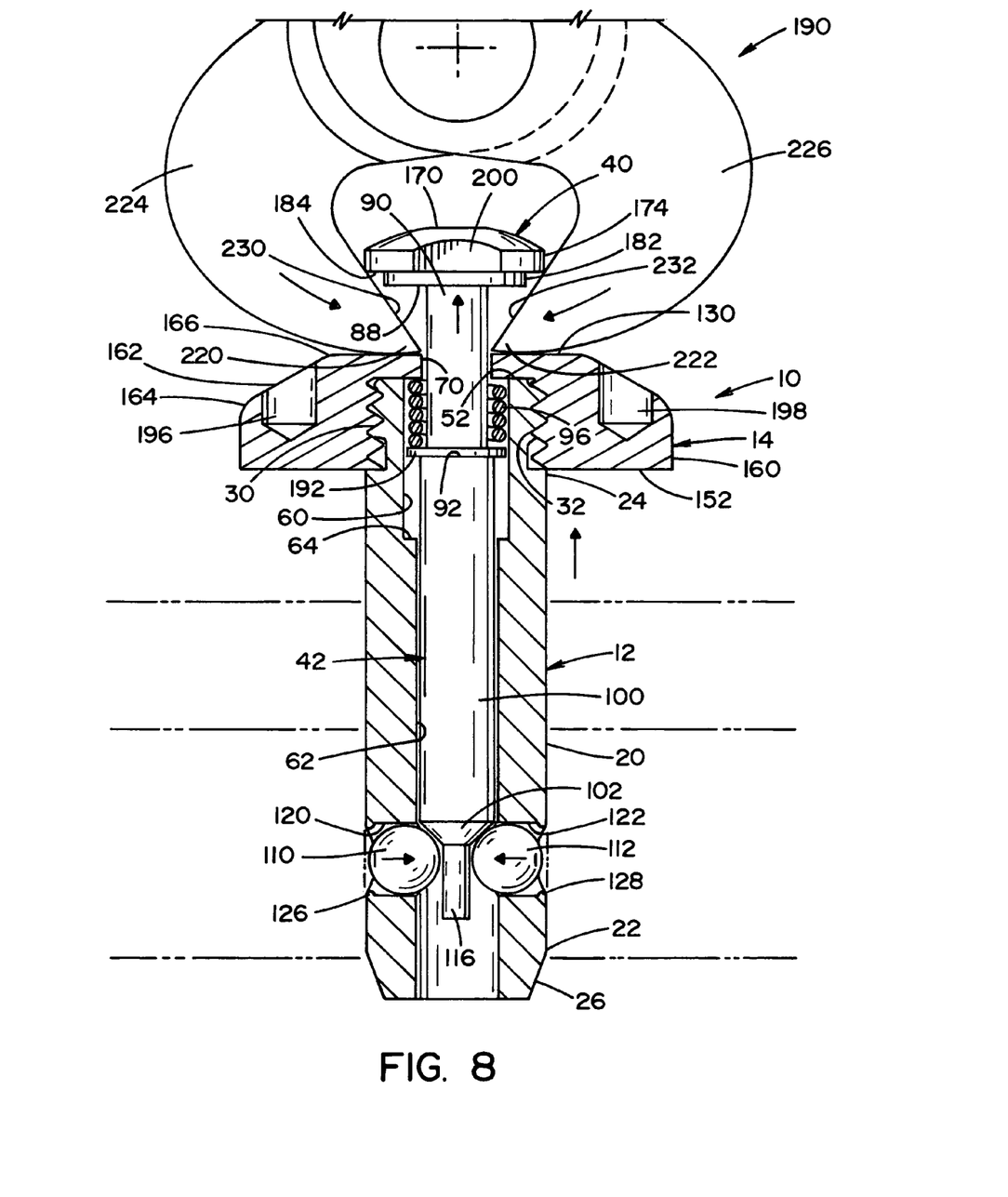
FIG. 8 is the enlarged sectional view shown in FIG. 6 and the tool shown in FIG. 7 wherein the pin is in the unlocked position.

As is best shown in FIGS. 6 and 8, release pin 10 can be actuated between a locked condition shown in FIG. 6 and an unlocked position shown in FIG. 8. More particularly, when in the locked position, spring pressure produced by spring 96 urges spindle shaft 42 inwardly in the longitudinal direction L until edge 88 of knob 40 engages a top surface 130 of bushing 14. However, other stop arrangements could be utilized without detracting from the invention of this application. When in this position, balls 110 and 112 engage bearing portion 100 thereby forcing these balls radially outwardly from the longitudinal direction such that the outer portions of these balls extend outwardly of holes 120, 122, respectively. Further, in view of the engagement with the spindle shaft, these balls are prevented from moving inwardly which thereby produces a locking arrangement or engagement with the workpiece. In FIG. 6, balls 110 and 112 engage workpiece C2 such that pin 10 is prevented from being removed from the workpiece without either unlocking the pin or damaging the workpiece and/or the release pin. Locking balls are known in the art to be an effective means for locking a release pin in a selected bore of a workpiece.

As knob 14 is moved longitudinally outwardly, spindle shaft 42 moves relative to locking balls 110 and 112. As this longitudinal movement increases, these balls approach cam portion 102 wherein as cam portion 102 passes balls 110, 112, these balls are allowed to move radially inwardly relative to longitudinal direction L. As this longitudinal movement of spindle continues, undercut 116 of spindle approaches locking balls 110 and 112 such that these locking balls are allowed to move inwardly enough to position these balls substantially within shank 12 such that the balls will not prevent the removal of the locking pin from the workpiece. As can be appreciated, once the locking balls have reached undercut 116, the unlocking of release pin 10 is completed.

Then, as knob 40 is released, the spring force produced by spring 96 returns the spindle to the locked position. As the spindle returns to the locked position, locking balls 110 and 112 are engaged by cam surface 102 which acts like a ramp to urge the balls back outwardly to their locked position.

Unlike the prior art discussed above, the actuation of the release pin according to this invention is such that the spindle is moved outwardly to unlock the release pin. This configuration goes against the standard practice in the art wherein the prior art release pins include a handle that can be gasped by the user with an inwardly compressing button that releases the locking mechanism when pushed. The user utilizes hand motion to pull the release pin from the workpiece as the button is pushed toward the workpiece. However, it has been found that this standard configuration produces an outer pin portion that has a substantial outer longitudinal height which can prevent the pin from being used in certain application. Further, the pull-style handle configuration of the prior art pins can produce a release pin that is not visually pleasing wherein it is not well adapted to use in some commercial applications or in relation to retail products.

Accordingly, the invention of this application eliminates the handle and the push button actuator with a pull knob 40 and a low profile bushing 14. More particularly, bushing 14 includes an abutment or abutment surface 152 configured to engage surface S1 of workpiece component B1. This configuration produces the arrangement where surface 152 engages workpiece surface S1 when release pin 10 is in the locked position within bores B1 and B2. In this locked position, shown in FIG. 6, locking balls engage surface S4 of component C2. As is shown, the workpiece is formed by two components which engage one another at surfaces S2 and S3 wherein release pin 10 is designed to maintain these components relative to one another such that surfaces S2 and S3 are maintained adjacent to one another. However, the pin of this application is not limited to being secured to this type of workpiece arrangement.

The bushing's low profile configuration can include a frustum cone configuration as is shown in FIG. 6. However, this application is not limited to this specific low profile design and other designs, even designs not considered to be low profile, could be used in connection with the invention of this application. With respect to the bushing design shown in this embodiment, bushing 14 includes an outer portion 160 and 162 wherein portion 160 is cylindrical and is adjacent to abutment 152. Outer configuration or surface 162 is spaced longitudinally outwardly from surface 160 and tapers inwardly such that bushing 162 has at least a portion of a frustum cone configuration. Surfaces 160 and 162 can be joined to one another by arcuate surface portion 164. Surface 162 can also be joined with outer surface 130 with an arcuate surface portion 166.

Figure 7:
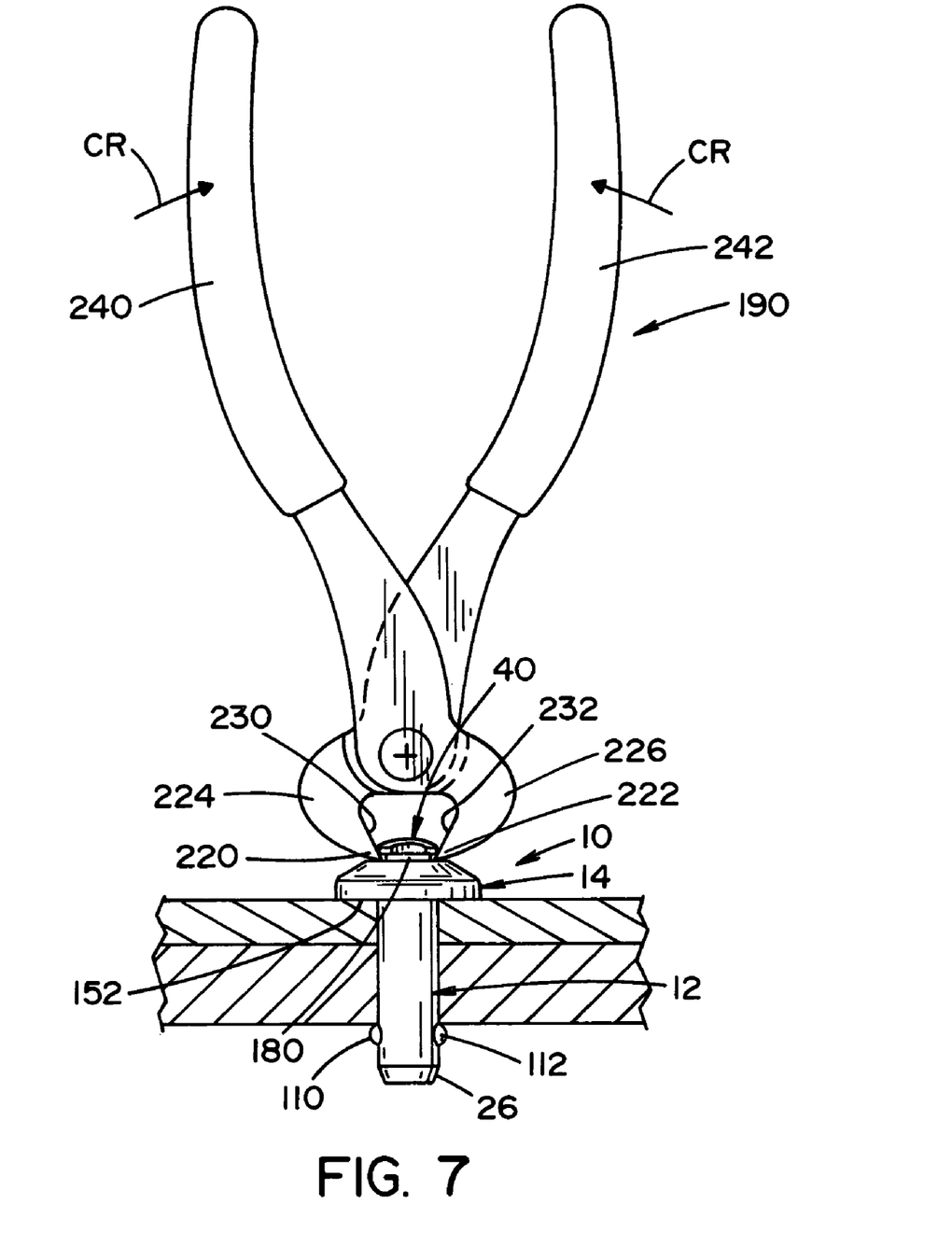
FIG. 7 is a side view in accordance with an embodiment of the present invention which includes the combination of the release pin shown in FIG. 2 and a tool for use with the release pin wherein the pin is in the locked position.

Similarly, knob 40 can also include a low profile design and can include a tool receiving nest or recess designed to limit or control who or when the release pin is unlocked. In this respect, knob 40 extends longitudinally outwardly from an inner surface 88 to an outer surface or extent 170. Knob 40 can further include an arcuate surface portion 172 extending from outer extent 170 to side edge 174. In this embodiment, edge 174 is cylindrical in configuration even though this is not required. Knob 40 can further include an undercut 180 in side 174 that can act as a tool receiving recess. In this particular configuration, undercut 180 can include an axial edge 182 and a radial edge 184 that are configured to receive a tool 190 as is shown in FIGS. 7 and 8 and which will be discussed in greater detail below. However, as can be appreciated, the undercut can be enlarged to allow access by other means for the end user to remove the pin from the associated workpiece. Further, other tool receiving recesses or configurations could be utilized without detracting from the invention. This includes, but is not limited to, cylindrical pockets transversely oriented relative to the longitudinal direction and could be utilized in relation to a tool having inwardly extending cylindrical jaw portions configured to enter these mating holes and remove and pull the knob to remove the pin.

Figure 9:
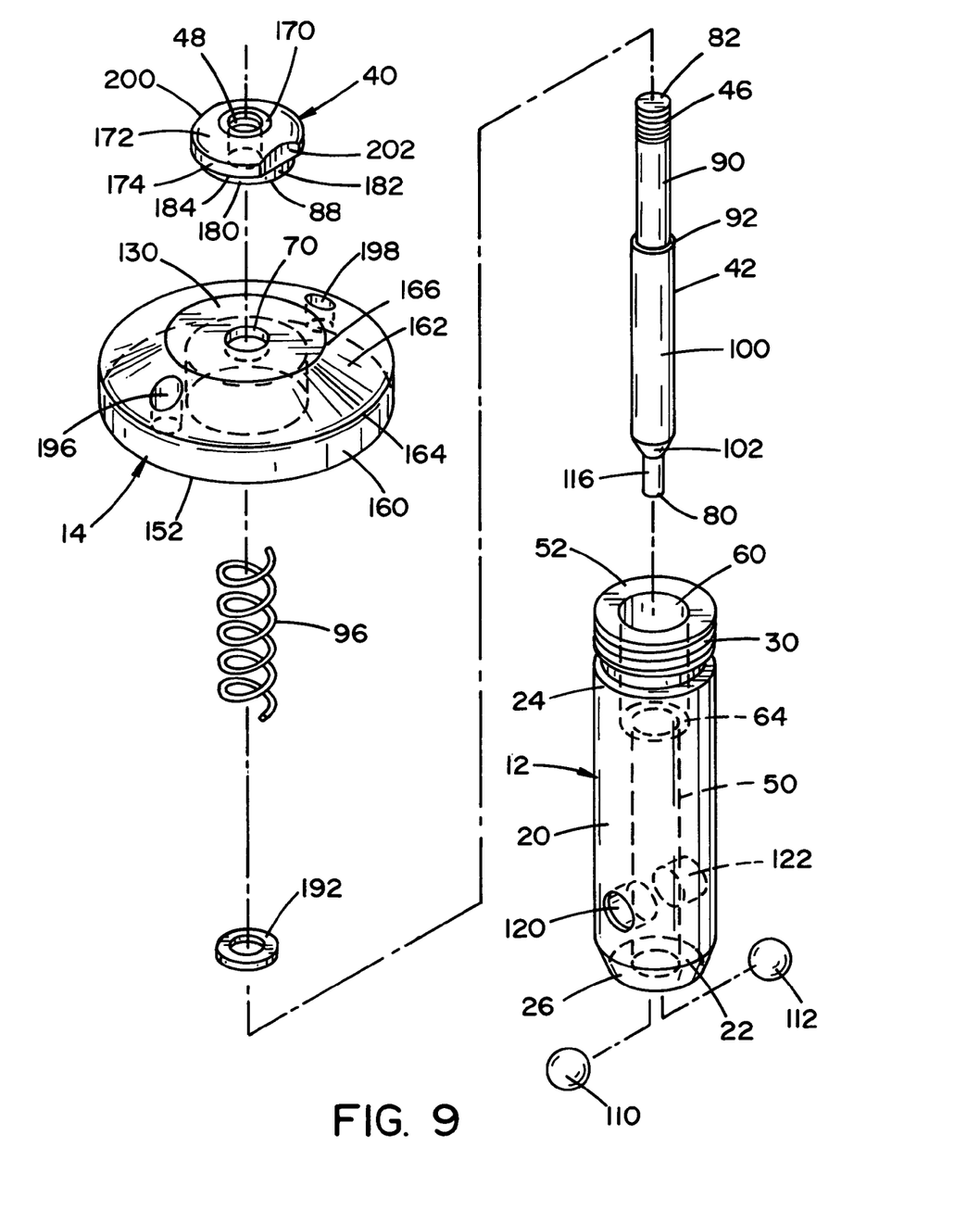
FIG. 9 is an exploded side perspective view of the release pin shown in FIG. 2; and, FIG. 10 is a sectional view of yet another embodiment of the present invention.

Release pin 10 can be assembled by any means known in the art. One such assembly can include the following. However, as can be appreciated, certain steps within this method of assembly can be altered and/or rearranged without detracting from the invention of this application. In this respect, spindle shaft 42 can first be positioned within passage 50 of shank 12. Once in position, a washer 192 can be placed over undercut 90 of the spindle. Washer 192 can be utilized to produce a better engagement between the return spring and the spindle. Once washer 192 is in position, spring 96 can be placed over the washer and bushing 14 can then be threaded onto shank 14. This threaded engagement can be set to a desired torque and can be reinforced by thread locking materials known in the art. Further, mechanical thread locking techniques can also be used such as swaging the threads to prevent the unthreading of the bushing from the shank. Further, bushing 14 can include assembly pockets 196 and 198 that can be used to rotate the bushing relative to the shank to help the threading process. Securing the shank for this assembly can be performed by any means known in the art including utilizing the ball pockets 120 and 122 to prevent the undesirable rotation of the shank during assembly. Once the bushing is in place, knob 40 can be threaded onto spindle shaft 42. As with the other components of the invention of this application, knob 40 can include flat surface portions 200 and 202 to help facilitate the rotation of the knob relative to the spindle. As can be appreciated, the spindle could be assembled after the bushing wherein the washer and spring would be assembled before the bushing is installed and the shaft could be assembled after the bushing is installed. Nonetheless, the threaded engagement between the knob and the spindle shaft prevents the removal of the spindle shaft from the release pin assembly.

Locking balls 110 and 112 can be assembled in shank 12 by positioning these balls within openings 120 and 122, respectively, then the balls can be staked in place wherein the shank is deformed to reduce the opening size of holes 120 and 122 near the surface of the shank. However, as can be appreciated, any other means of securing the balls within the shank can be utilized without detracting from the invention of this application.

As a result of the release pin configuration described in this application, the outer portion of the resulting release pin can be minimized. In this respect, release pin 10 includes an outer portion OP and an inner portion IP. More particularly, abutment 152, which is shown in one embodiment to be a surface, divides outer portion OP from inner portion IP of the release pin. The radially extending abutment 152 prevents the bushing from entering bores B1 and B2 thus retaining the bushing and the remaining portions of the outer portion above surface S1. As is shown in FIG. 6, bushing 14 and knob 40 are fully within the outer portion of release pin 10. However, shank 12, spring 198 and spindle shaft include regions in both the inner and outer portions. As a result of this design configuration, it has been found that outer portion OP can have a longitudinal height LH of less than 1 inch even for large release pins. Further, in one embodiment, the longitudinal height is less than 0.500 inches. In yet another embodiment, the longitudinal height can be reduced even further to be less than 0.350 inches. In one embodiment of the invention of this application, the longitudinal height is approximately 0.300 inches.

In yet another embodiment of the invention of this application, the bushing height is less than 0.500 inches and the knob height is less than 0.250 inches, thereby producing a longitudinal height that is less than 0.750 inches.

In yet another embodiment, the bushing has a longitudinal height that is less than 0.300 inches and the knob has a longitudinal height that is less than 0.150 inches wherein the outer portions longitudinal height is less than 0.450 inches.

In yet another embodiment, the longitudinal height of the bushing is approximately 0.200 inches and the longitudinal knob height is approximately 0.100 inches such that the outer longitudinal height of the release pin is approximately 0.300 inches. As can be appreciated, in view of the outward knob actuation, the longitudinal height of release pin 10 will increase as the release pin is moved from the locked position to the unlocked position.

In yet a further embodiment of the invention of this application, the undercut 180 can have one of many longitudinal height dimensions without detracting from the invention of this application. In this respect, undercut 180 can have a longitudinal height that is less than 0.100 inches.

In yet another embodiment, the undercut can have a longitudinal height of less than 0.050 inches. Further, the undercut can have varying radial depths based on the tool that is utilized to engage the knob and pull the knob to the unlocked position.

As is shown in FIGS. 7 and 8, tool 190 can be is utilized to actuate release pin 10 from a locked position shown in FIG. 7 to an unlocked position shown in FIG. 8. Undercut 180 allows the points 220 and 222 of jaws 224 and 226, respectively, to enter undercut 180 to facilitate the unlocking and removal of the locking pin. As can be appreciated, different tool designs can be utilized without detracting from the invention of this application. In one embodiment, tip 220 can include a ramp structure 230 and tip 222 can include a ramp structure 232 configured to urge knob longitudinally outwardly as handles 240 and 242 are compressed as is shown by arrows CR. By providing a tool that urges the knob outwardly by the compression of the handles, the unlocking of the pin can be controlled separately from the axial removal of the pin from the workpiece. However, as can be appreciated, the tool could include a horizontal flange-like jaw configured to merely engage undercut 180 wherein the entire tool is pulled longitudinally to both unlock and remove the release pin in a single motion. In either embodiment, the release pin according to these embodiments are configured to require a special tool to remove the release pin. While this configuration does not eliminate tampering by an unauthorized user, it reduces the ease of tampering and can discourage the removal by an unauthorized user.

Figure 10:
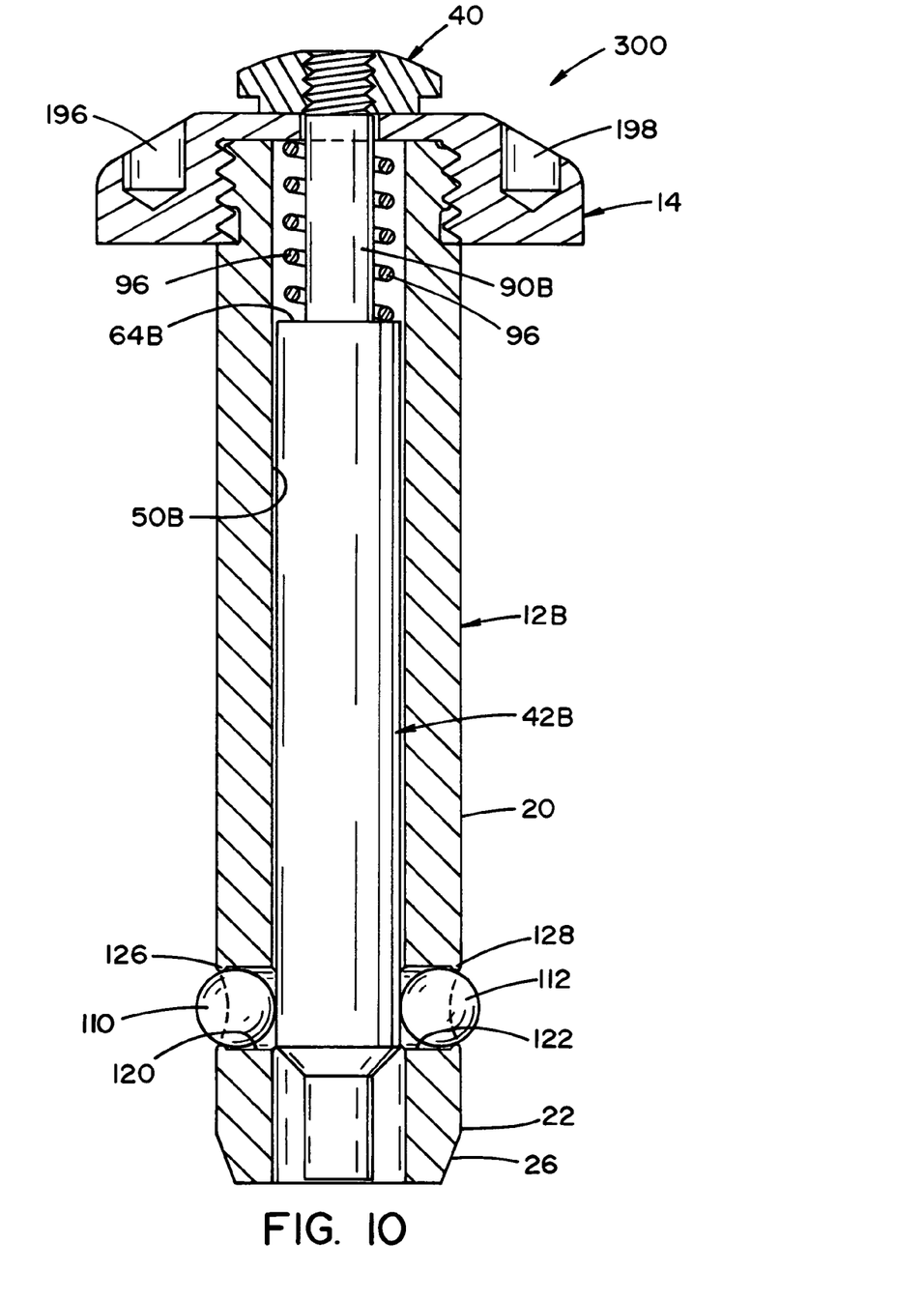

With reference to FIG. 10, shown is a release pin 300. More particularly, pin 300 shows that many of the configurations of the pins of this application can be modified without detracting from the invention of this application. In this respect, shank 12 can have any one of a number of configurations without detracting from the invention of this application. Pin 300 includes a shank 12B that has both a different diameter and a different length than shank 12 of release pin 10. As is known in the art, release pins are configured in a wide range of sizes so that they can be utilized in a wide range of applications involving different material, different stresses and different environments. As a result of this, these pins are provided in a wide range of diameters and are also provided in a wide range of lengths. Further, release pin 300 includes a different spring pocket configuration wherein passage 50B does not include a spring undercut. Conversely, spindle shaft 42B includes an increased undercut portion 90B which can also result in the elimination of support washer 92. As can be appreciated, the elimination of undercut portion 60 of release pin 10 can reduce costs by producing a passageway 50B having a unified configuration from end to end. Costs can also be reduced by the elimination of the support washer 92 in view of the increased area of ledge 64B. While not discussed in detail, the remaining portions of release pin 300 can include aspects of release pin 10 discussed above.

While not shown, the invention of this application can take on many forms to produce the low profile design of the invention of this application. This can include knob configurations and bushing configurations that are shaped differently than those shown in the drawings of this application which are, as is stated above, illustrative and not limiting. Further, while the tool receiving nest is shown on the knob, it could be positioned on the bushing and/or the knob could be a push knob.

While considerable emphasis has been placed on the preferred embodiments of the invention illustrated and described herein, it will be appreciated that other embodiments and/or equivalents thereof can be made, and that many changes can be made in the preferred embodiments without departing from the principles of the invention. Accordingly, it is to be distinctly understood that the foregoing descriptive matter is to be interpreted merely as illustrative of the invention and not as a limitation.

It is claimed:

1. A release pin for selective engagement with at least one work piece, said release pin moving between a locked condition and an unlocked condition, said release pin comprising:

an outer extent and an inner extent defining the overall length of said release pin in a longitudinal direction;

a shank extending along a shank axis in said longitudinal direction between an outwardly facing base end and an inwardly facing distal end, said shank having an exterior surface sized to extend longitudinally into an opening in an associated work piece and an internal passage extending in said longitudinal direction between said base end and said distal end and generally parallel to said exterior surface, said shank further including at least one transverse pocket disposed near said distal end and extending radially from said shank axis between said internal passage and said exterior surface;

a bushing joined to said shank at said base end, said bushing having an inwardly facing abutment surface for engaging the associated work piece and an outwardly facing outer surface longitudinally spaced from said abutment surface such that said longitudinal extent of said bushing is defined by said abutment surface engaging the associated work piece and said outer surface and defines a bushing height, said bushing further having an inwardly extending tapered surface between said abutment surface and said outer surface for providing a low profile of said pin, said bushing further including a central passage extending between said abutment surface and said outer surface and aligned with said internal passage, said abutment surface extending radially beyond said exterior surface of said shank such that said abutment surface limits the longitudinal insertion of said shank into the associated opening;

a spindle shaft extending longitudinally between a first end and a second end within said internal and central passages, said spindle shaft having a larger shaft portion near said second end and adjacent said base end of said shank, a smaller diameter undercut near said first end and adjacent said distal end of said shank, and a bearing portion extending between said larger shaft portion and said undercut, said spindle shaft being moveable relative to said shank and said bushing within said internal and central passages;

a locking ball positioned in each said at least one transverse pocket and each said at least pocket including a crimped edge portion limiting radially outward movement of said ball such that said locking ball is maintained in said at least one pocket between said crimped edge and said spindle shaft, wherein when in said locked condition, said spindle shaft is aligned with said shank such that said ball engages said bearing portion, and wherein when said spindle shaft is moved longitudinally outward within said internal passage to said unlocked condition, said spindle shaft is aligned with said shank such that said ball can enter said undercut;

a spring positioned within said internal passage and engaging said larger shaft portion at one end and said bushing at another end, said spring engaging said spindle shaft such that said spring urges said spindle shaft inwardly from said unlocked condition to said locked condition; and a knob fixed to said second end of said spindle shaft, said knob extending outwardly from said bushing and having an outer surface defining an outer extent of said knob and said outer extent of said release pin, said knob further having an inner surface opposite of said outer knob surface and said inner and outer knob surfaces defining a knob height, said inner knob surface engaging said outer surface of said bushing when said knob is in said locked condition and said inner knob surface being spaced from the outer bushing surface when said pin is in said unlocked condition, said knob further having an inwardly extending tapered surface between said outer knob surface and said inner knob surface for providing a low profile of said pin and prevent removal of the pin by hand when in the locked condition, outward movement of said knob actuating said spindle shaft to align said ball in said recess such that said release pin is actuated from said locked condition to said unlocked condition, said spring opposing said outward movement and automatically moving said release pin back to said locked condition when said knob is released, said pin having an outer longitudinal height defined by the spacing between said abutment surface of said bushing and said outer extent of said knob, said outer longitudinal height being less than 1 inch when said release pin is in said locked condition.

2. The release pin of claim 1, wherein said outer longitudinal height is a first outer longitudinal height when said pin is in the locked position and a second outer longitudinal height when said pin is in the unlocked position, said second outer longitudinal height being greater than said first outer longitudinal height.

3. The release pin of claim 1, wherein said outer longitudinal height is less than 0.500 inches.

4. The release pin of claim 1, wherein said outer longitudinal height is less than 0.350 inches.

5. The release pin of claim 1, wherein said outer longitudinal height is approximately 0.300 inches.

6. The release pin of claim 1, wherein said knob height and said bushing height together substantially forming said outer longitudinal height when said pin is in said locked position, said busing height being less than 0.500 inches and said knob height being less than 0.250 inches.

7. The release pin of claim 6, wherein said bushing height is less than 0.300 inches and said knob height is less than 0.150 inches.

8. The release pin of claim 7, wherein said bushing height is approximately 0.200 inches and said knob height is approximately 0.100 inches.

9. The release pin of claim 1, wherein a portion of said bushing near said outer surface of said bushing is shaped like a frustum cone relative to said shank axis.

10. The release pin of claim 9, wherein said bushing includes a cylindrical portion between said inwardly extending tapered surface and said abutment surface.

11. The release pin of claim 1, wherein said bushing has a width transverse to said longitudinal direction, said width of said bushing being greater than said outer longitudinal height for providing a low profile relative to the associated work piece.

12. The release pin of claim 1, wherein said knob includes a tool receiving groove extending about its perimeter.

13. The release pin of claim 1, wherein said abutment surface of said bushing has an abutment width transverse to said longitudinal direction, said abutment width being greater than said bushing height.

14. The release pin of claim 1, wherein said height of said bushing is greater than said height of said knob.

15. The release pin of claim 1, wherein said knob is a separate component of said shaft and is threadingly engaged to said shaft.

16. The release pin of claim 1, wherein said inwardly facing distal end is said inner extent.

17. The release pin of claim 1, wherein said knob further includes a tool receiving groove between said knob inner and outer surfaces, said groove being configured to allow an associated tool to actuate said pin from said locked condition to said unlocked condition.

18. The release pin of claim 17, wherein said longitudinal height of said groove is less than 0.100 inches.

19. The release pin of claim 17, wherein said longitudinal height of said groove is less than 0.050 inches.

20. The release pin of claim 17, wherein said tool receiving groove is at said knob inner surface.

21. The release pin of claim 17, wherein said tool receiving groove is a circumferentially extending groove having a longitudinal height less than 0.200 inches.

22. The release pin of claim 17, wherein said inner surface of said knob and said outer surface of said knob are joined by a side edge, said tool receiving groove being an L-shaped recess extending into both said knob side edge and said knob inner surface.

23. The release pin of claim 22, wherein said knob side edge is includes a cylindrical portion and a conical portion, said L-shaped recess extending into said cylindrical portion.

24. The release pin of claim 1, wherein at least a portion of said central passage of said bushing is smaller than said internal passage of said shank, said spring extending between said central passage portion and said spindle shaft for said urging of said spindle inwardly from said unlocked condition to said locked condition.

* * * * *